July 16, 1946.　　A. O. WILLIAMS　　2,404,115
AXLE GENERATOR DRIVE
Filed May 22, 1944　　4 Sheets-Sheet 1

INVENTOR.
Alfred O. Williams
BY Walter E. Schirmer
Atty.

July 16, 1946.  A. O. WILLIAMS  2,404,115
AXLE GENERATOR DRIVE
Filed May 22, 1944  4 Sheets-Sheet 3

INVENTOR.
Alfred O. Williams
BY Walter E. Schirmer
Atty.

July 16, 1946. A. O. WILLIAMS 2,404,115
AXLE GENERATOR DRIVE
Filed May 22, 1944 4 Sheets-Sheet 4
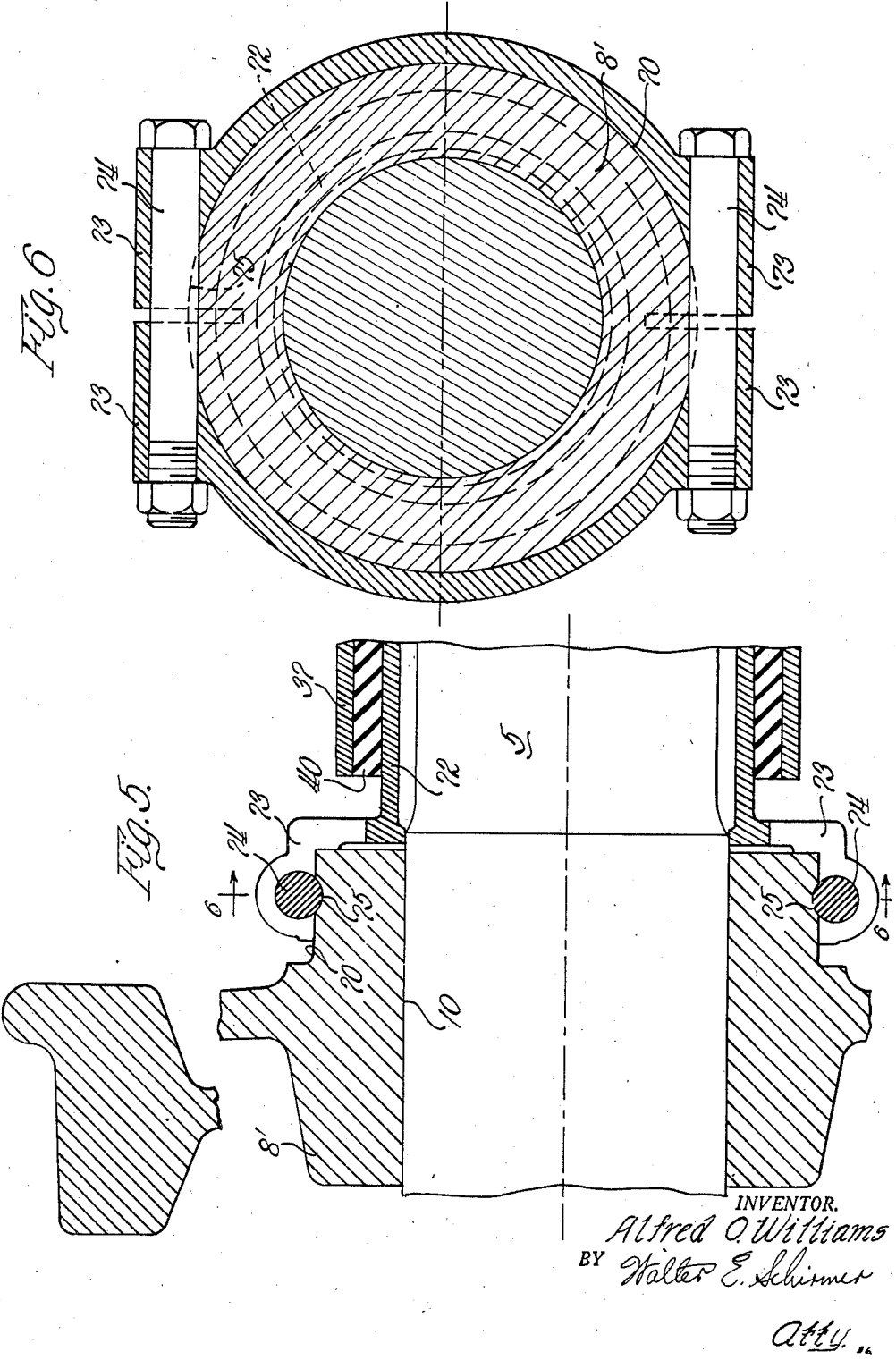
INVENTOR.
Alfred O. Williams
BY Walter E. Schirmer
Atty.

Patented July 16, 1946

2,404,115

UNITED STATES PATENT OFFICE 2,404,115

AXLE GENERATOR DRIVE

Alfred O. Williams, Battle Creek, Mich., assignor to Clark Equipment Company, Buchanan, Mich., a corporation of Michigan Application May 22, 1944, Serial No. 536,849

11 Claims. (Cl. 105—131)

1

This invention relates to axle generator drives, and is more particularly concerned with the arrangement and mounting of a drive mechanism on the axle of a rail vehicle for driving a generator carried by the vehicle body.

Numerous attempts have been made to provide such drives in the past, some of which contemplate the use of a pulley on the axle drive through a belt to a generator shaft, and others involving the use of gearing.

It appears that one of the primary problems involved in the provision of such a drive is to install a mechanism on the axle shaft without requiring any change in the shaft itself and yet not introducing into the shaft any undue stresses that might reduce the life of the shaft or hasten failure of the shaft through erosion, overstressing of localized points or the like. As a result, it has been considered impractical to weld, bolt or otherwise secure a gear to the shaft, as the connection must be sufficiently floating to accommodate the torque reactions between the shaft and the generator. Also, the design must be such that it will accommodate itself to existing axle constructions now in use on rail vehicles, while yet providing for centering of the gear with respect to the axis of the rotation of the shaft and accommodating the circumferential torque disturbances produced by the reactions between the car body and the car truck.

The present invention has for its primary object the provision of an axle shaft drive for generators in which the drive is provided by a bevel gear mounted for conjoint rotation with the shaft and driving a pinion which in turn, through a suitable propeller shaft, is adapted to drive a generator supported preferably on the under side of the car floor. In order to absorb reactions the gear must be so mounted as not to interfere with normal flexing of the axle shaft and not to impose any stresses thereon for which the shaft has not been designed. In addition, a rotatable mounting must be provided within the housing which encloses the gear, this housing in turn being suitably supported through torque reaction members to provide proper gear action in the event of relative movement between the car truck and the car body.

Still another feature of the present invention is to provide a reaction cushioning means between the gear mounted for conjoint rotation with the axle and the axle shaft, while yet providing for positive drive thereto during the normal operation of the vehicle.

Another feature of the present invention re-

2 sides in the provision of a construction which will be capable of installation on existing equipment, and also designed for ready maintenance, inspection and repair.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 5 is a sectional view through the wheel hub showing a modified clamping arrangement; and Figure 6 is a sectional view taken on line 6—6 of Figure 5.

Figure 1:
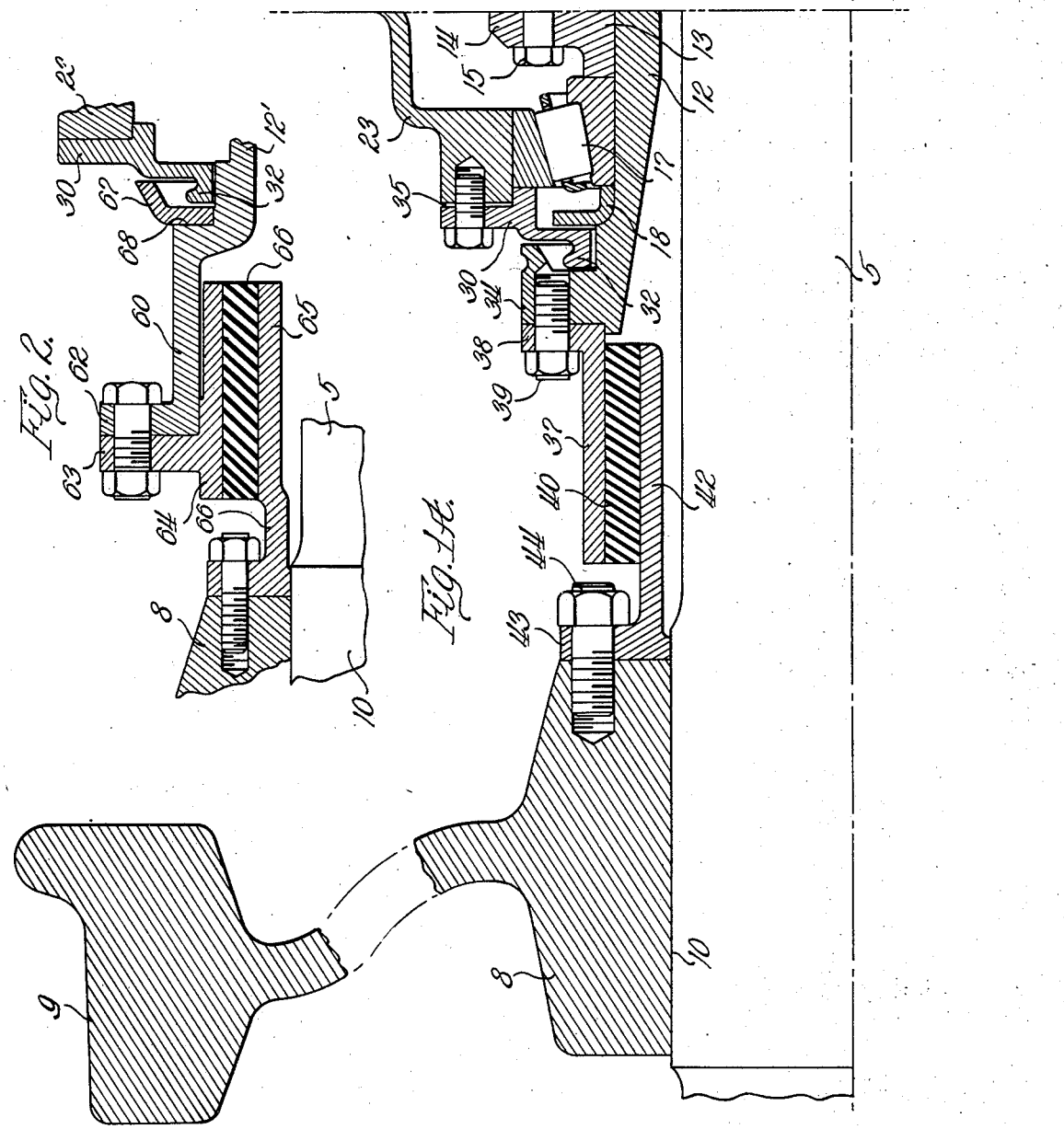
Figure 1A is a transverse sectional view through an axle having a generator drive mechanism mounted thereon.
Figure 1B is a continuation of the structure shown in Figure 1A.

Considering now the construction shown in Figures 1A and 1B, there is provided an axle shaft 5 of conventional design such as that now used in rail vehicles of the freight or passenger type. This shaft has a tapered portion 6 leading to a substantially straight central portion 7, the tapering of the shaft being for the purpose of accommodating flexing of the shaft under load, the design of the taper and the length thereof being accurately determined for the type of car which is mounted on the truck. The shaft 5 is adapted to have mounted thereon a flanged car wheel 8 having the tread portion 9 engaging the rails upon which the truck operates, and having the hub portion pressed onto an enlarged section 10 of the shaft under an appreciable pressure such as to form a rigid driving connection therebetween.

To provide for driving a gear from the axle shaft without rigidly attaching the gear directly to the shaft, I have disclosed a cast metal sleeve 12 radially encircling the shaft and spaced therefrom to provide annular clearance therebetween. The sleeve 12 with the components thereof is mounted on the shaft prior to the time that the wheel 8 is pressed thereon.

The sleeve 12 is provided with a flanged sleeve 13 pressed thereon having the flange portion 14 through which are extended studs 15 by which the sleeve carries the annular ring gear 16, the gear 16 thus being rigidly connected for conjoint rotation with the elongated sleeve 12. On one side of the gear and sleeve assembly there is provided the tapered roller bearing assembly 17 having an oil seal 18, and spaced from the opposite end of the sleeve 13 by means of the spacer 19 is a second tapered roller bearing assembly 20 having an oil seal 22.

Figure 4:
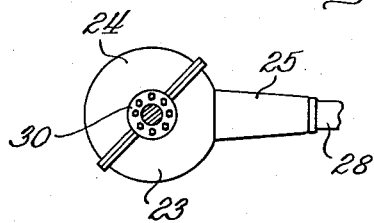
Figure 4 is a diagrammatic view showing the construction of gear housing.

This provides for mounting the gear and associated sleeve 12 for free rotation within a split housing 23, which housing is shown more in detail in Figure 4 as a cover portion 24 mated with the main housing portion 23 along an angularly extending plane, the housing 23 having a forwardly projecting nose portion 25 provided with suitable bearing supports for a pinion shaft 26 carrying the pinion gear 27 meshing with the ring gear 16. The outer end of the pinion shaft 26 is connected through a suitable coupling to the propeller shaft 28 leading to the drive shaft of the generator.

Mounted over the bearing seal members 18 and 22 and closing the opposite ends of the housing 23 are cap members 30 which are bolted or otherwise secured to the radial faces of the housing 23, and which enclose the oil seal members 18 and 22. These end cap members 30 are provided with oil slinger portions 32, and are closed by the end member 33 mounted at the right-hand end of sleeve 12 and by a flanged portion 34 at the left-hand end of the sleeve 12. The end cap members 30 may be provided with suitable shims either at the face where they are bolted to the housing 23 as indicated at 35, or against the outer annular race of the bearing assemblies 17 and 20 as indicated at 36 in Figure 1B for purposes of adjustment of the bearings within the housing 23.

To provide for positive connection of the sleeve 12 carrying the ring gear 16 in driving relation to the axle, there is bolted to the left-hand end of the sleeve 12 the cylindrical flanged member 37 which has the flange portion 38 rigidly secured to the end of the sleeve 12 by means of studs 39. An annular rubber cylinder 40 is interposed between the internal annular surface of the sleeve 37 and the external annular surface of the extended cylindrical portion 42 of the member 43, which member is securely bolted to the hub of the wheel 8 as by means of the studs 44. Preferably, the rubber cylinder 40 is vulcanized to both of these surfaces to provide rigid connection thereto whereby the rubber is stressed when there is a torque reaction between the members 43 and 37. Thus, when the vehicle starts and the wheel 8 begins to rotate, a cushioned drive is provided between the wheel 8 and the sleeve 12 through the rubber connection 40.

Figure 3:
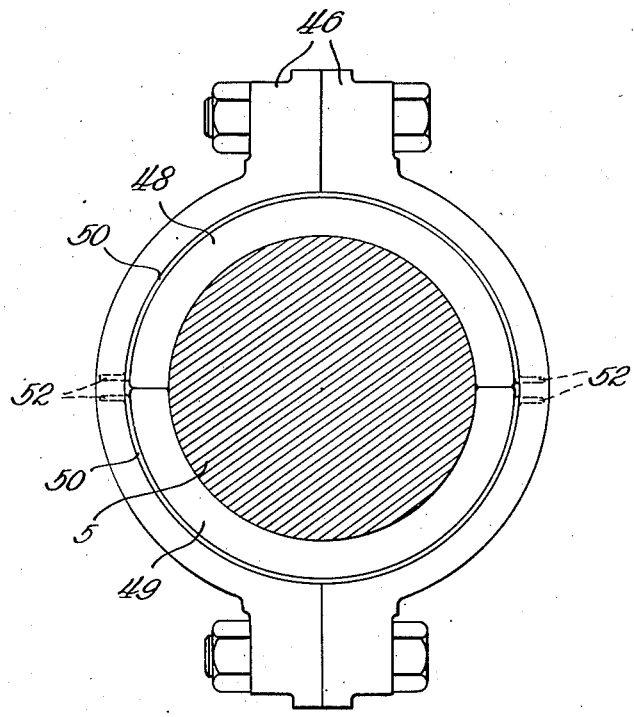
Figure 3 is a sectional view taken substantially on line 3—3 of Figure 1B.

At the opposite end of the sleeve 12 there is provided a split clamp member 46 which is securely clamped about the end 47 of the sleeve 12, and has a reduced portion indicated clearly in Figure 3 adapted to be clamped about the axle shaft 12.

Interposed between the reduced end of the clamp 46 and the external surface of the shaft 12 there are provided two semi-cylindrical rubber elements 48 and 49. Each of these elements is provided on its external arcuate surface with thin metal members 50 vulcanized or otherwise secured thereto, and having outturned ends 52 seated in the clamping members 46 to prevent relative rotation between the rubber elements 48 and the clamp members.

Thus, when the two halves of the member 46 are clamped together the rubber elements 48 and 49 are compressed about the external surface of the shaft 5 and they are locked against rotation. This provides for rigid connection or support for the end 47 of the sleeve 12 upon the axle shaft. Since rubber connections are provided at both ends of the sleeve 12, it is apparent that there is no metallic connection of the gear 16 to the axle shaft and that the driving connection is effected through rubber elements which do not in any way stress the shaft or produce any changes in the loads carried thereby.

Due to the bearings 17 and 20, it is apparent that the gear 16 with the associated sleeve 12 is free to rotate conjointly with the axle 5 to provide for conjoint rotation of gear 16 while the housing 23 is maintained in a substantially fixed position, being movable only in accordance with relative movements between the car axle and the car body. Rotation of gear 16 drives pinion 27 which, through shaft 26, imparts torque to the generator carried by the car body. It will be apparent that because of the split design of the housing 23, this housing can be removed from the shaft without disturbing the connections of the sleeve 12 to the shaft and without requiring removal of the wheel 8. As a result, the entire mechanism is capable of ready assembly, maintenance and repair once the sleeve 12 has been secured in driving position.

Figure 2:
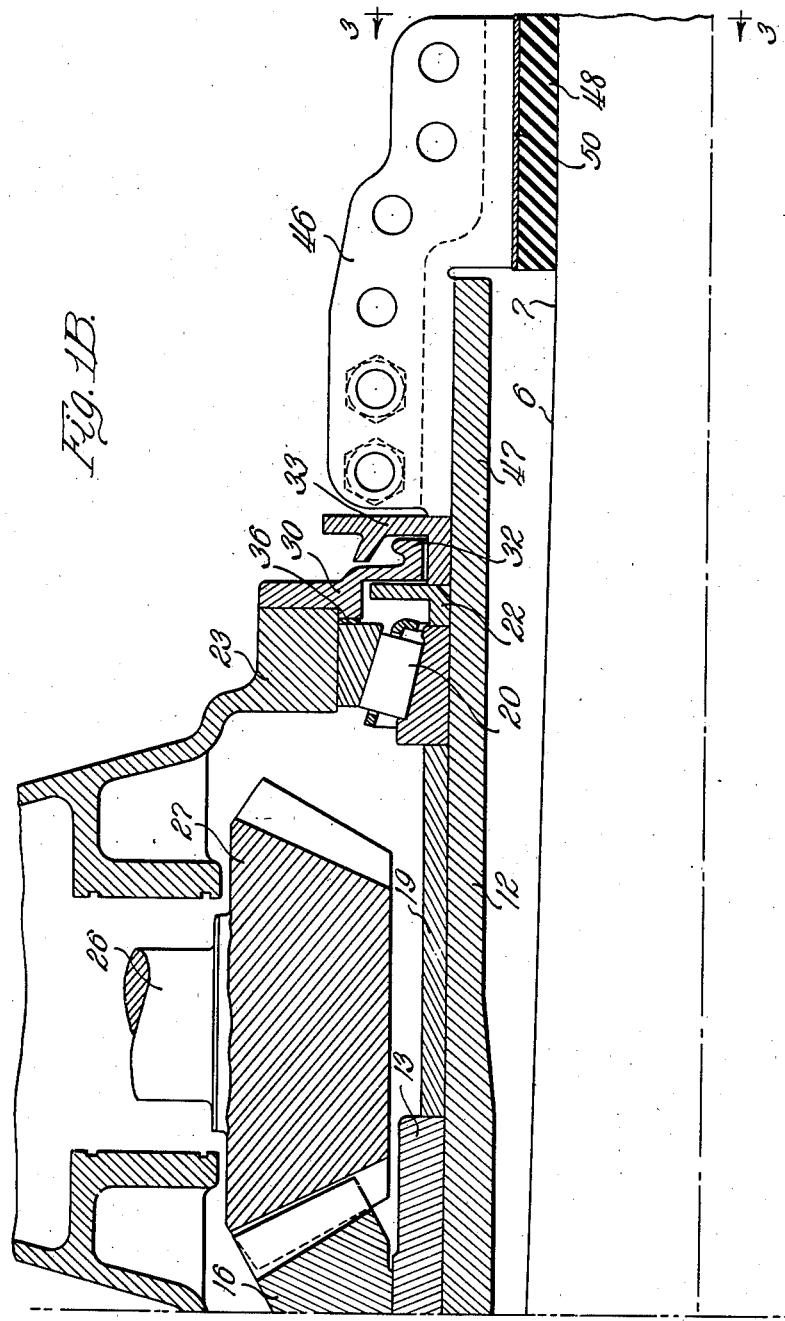
Figure 2 is a detail sectional view showing a modified arrangement for connecting the axle drive gear to the shaft.

In Figure 2 I have disclosed a modified form of construction in which the sleeve 12' is provided with a radially enlarged axially extending portion 60 terminating in a radial flange 62. This flange is bolted to the corresponding radial flange 63 of a cylindrical sleeve member 64 disposed in radial alinement with the cylindrical sleeve portion 65 of the member 66 bolted to the hub of the wheel 8. Interposed between the adjacent annular surface of the members 64 and 65 is the cylindrical rubber disc 66 which may be vulcanized to the surfaces to provide for a non-metallic driving connection between the axle 5 and the sleeve 12'. With such a construction the oil slinger portion 32 of the end cap 30 is axially enclosed within the disc 67 supported on the sleeve 12' adjacent the shoulder 68. In all other respects the arrangement shown in Figures 1A and 1B is provided in the embodiment shown in Figure 2.

In Figures 5 and 6 I have disclosed a modified means of connecting the driving sleeve 12 to the rail wheel of the vehicle. The wheel 8' in this form of construction which is mounted on the surface 10 of the axle 5 has the inboard side of its hub portion turned to form a cylindrical shoulder 70. The shoulder 70 which is annular in form is adapted to receive the connecting member or driving sleeve 72 which projects axially inwardly over the axle 5, and carries the rubber disc 40 coupled to the connecting sleeve 37. Adjacent the wheel hub the sleeve 72 is enlarged radially and provided with split clamp portions engaging around the annular surface, these split clamp portions being indicated at 73. The clamp portions 73 are slotted and a suitable stud or bolt 74 is extended therethrough and serves to tighten these clamp portions firmly around the annular shoulder 70. The shoulder 70 itself is provided with arcuate recess portions 75 located at diametrically opposite points and extending parallel to each other into which the bottom portion of the bolt 74 extends. This provides for non-rotatively locking the sleeve 72 to the hub of the wheel 8', and provides a fixed clamping engagement which eliminates the necessity of tapping the holes for receiving the studs 44 as shown in Figure 1A.

With this construction, therefore, the sleeve 72 is non-rotatively connected in fixed clamped engagement to the hub of the wheel 8', but may be readily dismounted therefrom by removal of the bolts 74.

It is therefore believed apparent that I have provided a novel type of axle generator drive wherein there is no metallic connection between the driving gear and the axle shaft, and also there is no distortion of the axle shaft itself. Consequently, the shaft maintains all of its desired characteristics as an axle shaft and yet provides for accommodating a ring gear for driving the generator.

It is to be understood that certain details of the present construction may be modified within wide limits without departing from the underlying principles thereof, and I therefore do not intend to be limited except as defined by the scope and spirit of the appended claims.

I claim:

1. In combination, a solid vehicle axle having a wheel fixed thereon, an axially extending driving member fixed to the inboard side of said wheel and spaced radially about said axle, a sleeve member surrounding said axle and spaced radially therefrom, said sleeve member having a radially enlarged end portion telescoping over said drive member, a gear secured to said sleeve member, non-metallic resilient means compressed between said end portion and said driving member and interconnecting said driving member and said end portion of said sleeve member for driving said gear, and a non-metallic resilient support on said axle for the opposite end of said sleeve member.

2. The combination of claim 1 including a gear housing about said gear, bearing means on said sleeve member rotatably mounting it in said housing, and a pinion shaft extending out of said housing and driven by said gear.

3. The combination of claim 1 wherein said non-metallic resilient means comprises a rubber cylinder vulcanized between adjacent overlapping annular surfaces of said driving member and said enlarged end portion whereby torque imposed therethrough stresses said rubber in shear.

4. The combination of claim 1 wherein said non-metallic resilient support includes semi-cylindrical rubber sections radially clamped about the external surface of said axle.

5. In combination, a solid axle having a wheel pressed thereon, an axially extending annular driving member secured to the inboard side of said wheel, an elongated sleeve member encircling said axle and radially spaced therefrom, supporting means at the end of said sleeve member remote from said wheel including a non-metallic resilient support clamped around the external surface of said axle, supporting means at the opposite end of said sleeve member including a non-metallic resilient connection to said driving member, a ring gear secured about said sleeve member, a split housing enclosing said ring gear, bearing means on said sleeve member rotatably mounting it in said housing, and a pinion shaft journalled in said housing and driven from said ring gear upon rotation of said axle.

6. In combination, in an axle drive for a generator, a solid axle having a rail wheel pressed on the end thereof, an elongated sleeve encircling a portion of said axle and out of contact therewith, support means for the inner end of said sleeve including a clamp member engaging about said sleeve end and having non-metallic resilient clamping engagement about said axle, a radially enlarged axial extension on the opposite end of said sleeve adjacent said wheel, an axially extending driving member secured to the hub of said wheel and telescoping into said extension, a rubber ring vulcanized between adjacent annular surfaces of said driving member and extension to provide a resilient driving connection therebetween, and a ring gear fixed on said sleeve.

7. In combination, a solid rail truck axle having a wheel pressed on one end thereof, an axially extending driving member secured to the inboard hub portion of the wheel and spaced radially about said axle, a sleeve radially encircling said axle and carrying gear means thereon, one end of said sleeve having a radially enlarged portion overlying said driving member, rubber means interposed between said overlying portion and said driving member for transmitting torque therebetween, clamp means carried by the other end of said sleeve, and rubber means encircling said axle and clamped thereto by said clamp means for resiliently supporting the opposite end of said sleeve.

8. The combination of claim 7 wherein said driving member is bolted to the inboard radial face of the hub of said wheel.

9. The combination of claim 7 wherein said enlarged end portion of said sleeve is detachable therefrom.

10. The combination of claim 7 wherein said rubber means is vulcanized between adjacent annular surfaces of said driving member and said enlarged end portion, said end portion being detachably secured to said sleeve.

11. The combination of claim 7 wherein the hub of said wheel has a machined annular shoulder, and said driving member is provided with split clamping means secured about said shoulder.

ALFRED O. WILLIAMS.